United States Patent
Wang et al.

(10) Patent No.: US 10,100,638 B2
(45) Date of Patent: Oct. 16, 2018

(54) METHOD FOR RESERVOIR EVALUATION EMPLOYING NON-EQUILIBRIUM ASPHALTENE COMPONENT

(71) Applicant: Schlumberger Technology Corporation, Sugar Land, TX (US)

(72) Inventors: Kang Wang, Beijing (CN); Youxiang Zuo, Burnaby (CA); Yi Chen, Sugar Land, TX (US); Oliver C. Mullins, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 516 days.

(21) Appl. No.: 14/945,800

(22) Filed: Nov. 19, 2015

(65) Prior Publication Data

US 2016/0146004 A1 May 26, 2016

Related U.S. Application Data

(60) Provisional application No. 62/082,491, filed on Nov. 20, 2014.

(51) Int. Cl.
*G01V 1/40* (2006.01)
*G06G 7/48* (2006.01)
(Continued)

(52) U.S. Cl.
CPC .......... *E21B 49/087* (2013.01); *E21B 49/088* (2013.01); *E21B 49/10* (2013.01); *G01V 99/005* (2013.01); *E21B 2049/085* (2013.01)

(58) Field of Classification Search
CPC ....... G01V 99/005; E21B 49/08; E21B 49/10; E21B 49/087; E21B 2049/085
See application file for complete search history.

(56) References Cited

U.S. PATENT DOCUMENTS

| 4,994,671 A | 2/1991 | Safinya et al. |
| 7,398,159 B2 * | 7/2008 | Venkataramanan .. E21B 49/005 |
| | | 702/11 |

(Continued)

OTHER PUBLICATIONS

Muskat, "Distribution of non-reacting fluids in the gravitational field", Jun. 1, 1930, vol. 35, pp. 1384-1393.

(Continued)

*Primary Examiner* — Alonzo Chambliss
(74) *Attorney, Agent, or Firm* — Michael Dae

(57) ABSTRACT

The present disclosure relates to a method for characterizing a hydrocarbon reservoir of interest traversed by at least one wellbore that includes (a) using a numerical model to simulate over geological time a non-equilibrium concentration of an asphaltene component as a function of location within the wellbore, (b) analyzing fluid samples acquired from at least one wellbore that traverses the reservoir of interest to measure concentration of the asphaltene component as a function of location within the wellbore, (c) comparing the non-equilibrium concentration of the asphaltene component as a function of location within the wellbore resulting from the simulation of (a) to the concentration of the asphaltene component as a function of location within the wellbore as measured in (b), and characterizing the reservoir of interest based upon the comparing of (c).

17 Claims, 5 Drawing Sheets

(51) Int. Cl.
*E21B 49/08* (2006.01)
*G01V 99/00* (2009.01)
*E21B 49/10* (2006.01)

(56) References Cited

U.S. PATENT DOCUMENTS

| | | | | |
|---|---|---|---|---|
| 7,526,953 | B2* | 5/2009 | Goodwin | E21B 47/10 |
| | | | | 250/255 |
| 7,822,554 | B2* | 10/2010 | Zuo | G01N 33/2823 |
| | | | | 175/40 |
| 7,966,273 | B2* | 6/2011 | Hegeman | G06N 3/02 |
| | | | | 166/264 |
| 7,996,154 | B2 | 8/2011 | Zuo et al. | |
| 8,805,617 | B2* | 8/2014 | Zuo | E21B 49/10 |
| | | | | 702/10 |
| 8,825,408 | B2* | 9/2014 | Freed | E21B 49/00 |
| | | | | 166/264 |
| 8,996,346 | B2 | 3/2015 | Zuo et al. | |
| 9,322,268 | B2* | 4/2016 | Zuo | E21B 49/10 |
| 9,410,936 | B2* | 8/2016 | Zuo | E21B 49/00 |
| 2009/0312997 | A1 | 12/2009 | Freed et al. | |
| 2012/0296617 | A1 | 11/2012 | Zuo et al. | |
| 2014/0200810 | A1 | 7/2014 | Zuo et al. | |

OTHER PUBLICATIONS

Onsager, "Reciprocal relations in irreversible processes: I", 1931, Rev. 37, pp. 405-426.
Onsager, "Reciprocal relations in irreversible processes: II", 1931, Rev 38, pp. 2265-2279.
Ghorayeb, et al., "Modeling multicomponent diffusion and convection in porous media", Jun. 2000, SPE Journal 5, No. 2, pp. 158-171.
Hoier, et al., "Compositional Grading—Theory and Practice", Oct. 1-4, 2000, SPE Annual Technical Conference and Exhibition, Dallas, Texas, SPE Paper 63085, 16 pages.
Alboudwarej, et al., "Regular solution model for asphaltene precipitation from bitumens and solvents", Nov. 2003, American Institute of Chemical Engineers Journal, vol. 49, No. 11, pp. 2948-2956.
Mullins, "The Modified Yen Model", 2010, Energy Fuels, vol. 24, No. 4, pp. 2179-2207.
Zuo, et al., "Interpretation of DFA Color Gradients in Oil Columns Using the Flory-Huggins Solubility Model", Jan. 8-10, 2010, SPE International Oil and Gas Conference and Exhibition, Beijing, China, SPE 130305, 14 pages.
Zuo, et al., "Equation-of-State-Based Downhole Fluid Characterization", Mar. 2011, SPE Journal , Paper 114702, 10 pages.
Mullins, et al., "Advances in asphaltene science and the Yen-Mullins model", 2012, Energy & Fuels, vol. 26, No. 7, pp. 3986-4003.
Zuo, et al., "Advances in the Flory-Huggins-Zuo equation of state for asphaltene gradients and formation evaluation", 2013, Energy & Fuels, vol. 27, No. 4, pp. 1722-1735.
Zuo, et al., "Asphaltene grading and tar mats in oil reservoirs", 2012, Energy & Fuels, vol. 26, No. 3, pp. 1670-1680.
Mullins, et al., "Clusters of asphaltene nanoaggregates observed in oilfield reservoirs", 2013, Energy & Fuels, vol. 27, No. 4, pp. 1752-1761.
Mullins, et al., "The Dynamics of Reservoir Fluids and their Substantial Systematic Variations", Apr. 2014, Petrophysics, vol. 55, No. 2, 17 pages.
Freed, et al., "Heuristics for Equilibrium Distributions of Asphaltenes in the Presence of GOR Gradients", Jun. 30, 2014, Energy & Fuels, vol. 28, No. 8, pp. 4859-4869.

* cited by examiner

METHOD FOR RESERVOIR EVALUATION EMPLOYING NON-EQUILIBRIUM ASPHALTENE COMPONENT

CROSS-REFERENCE TO RELATED APPLICATION

This application claims benefit of U.S. Provisional Patent Application Ser. No. 62/082,491, filed Nov. 20, 2014, which is herein incorporated by reference.

BACKGROUND OF THE DISCLOSURE

Wellbores or boreholes may be drilled to, for example, locate and produce hydrocarbons. During a drilling operation, it may be desirable to evaluate and/or measure properties of encountered formations and formation fluids. In some cases, a drillstring is removed and a wireline tool deployed into the borehole to test, evaluate and/or sample the formations and/or formation fluid(s). In other cases, the drillstring may be provided with devices to test and/or sample the surrounding formations and/or formation fluid(s) without having to remove the drillstring from the borehole.

Formation evaluation may involve drawing fluid from the formation into a downhole tool for testing and/or sampling. Various devices, such as probes and/or packers, may be extended from the downhole tool to isolate a region of the wellbore wall, and thereby establish fluid communication with the subterranean formation surrounding the wellbore. Fluid may then be drawn into the downhole tool using the probe and/or packer. Within the downhole tool, the fluid may be directed to one or more fluid analyzers and sensors that may be employed to detect properties of the fluid while the downhole tool is stationary within the wellbore.

SUMMARY

The present disclosure relates to a method for characterizing a hydrocarbon reservoir of interest traversed by at least one wellbore that includes (a) using a numerical model to simulate over geological time a non-equilibrium concentration of an asphaltene component as a function of location within the wellbore, (b) analyzing fluid samples acquired from at least one wellbore that traverses the reservoir of interest to measure concentration of the asphaltene component as a function of location within the wellbore, (c) comparing the non-equilibrium concentration of the asphaltene component as a function of location within the wellbore resulting from the simulation of (a) to the concentration of the asphaltene component as a function of location within the wellbore as measured in (b), and characterizing the reservoir of interest based upon the comparing of (c).

The present disclosure also relates to a system for characterizing a hydrocarbon reservoir of interest traversed by at least one wellbore that includes a downhole tool configured to collect formation fluid from the hydrocarbon reservoir of interest within a sample chamber disposed in a downhole tool and a controller including machine readable instructions disposed on a memory device. The instructions monitor or control operations of the downhole tool to (a) use a numerical model to simulate over geological time a non-equilibrium concentration of an asphaltene component as a function of location within the wellbore, (b) analyze fluid samples acquired from at least one wellbore that traverses the reservoir of interest to measure concentration of the asphaltene component as a function of location within the wellbore, (c) compare the non-equilibrium concentration of the asphaltene component as a function of location within the wellbore resulting from the simulation of (a) to the concentration of the asphaltene component as a function of location within the wellbore as measured in (b), and (d) characterize the reservoir of interest based upon the comparison of (c).

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
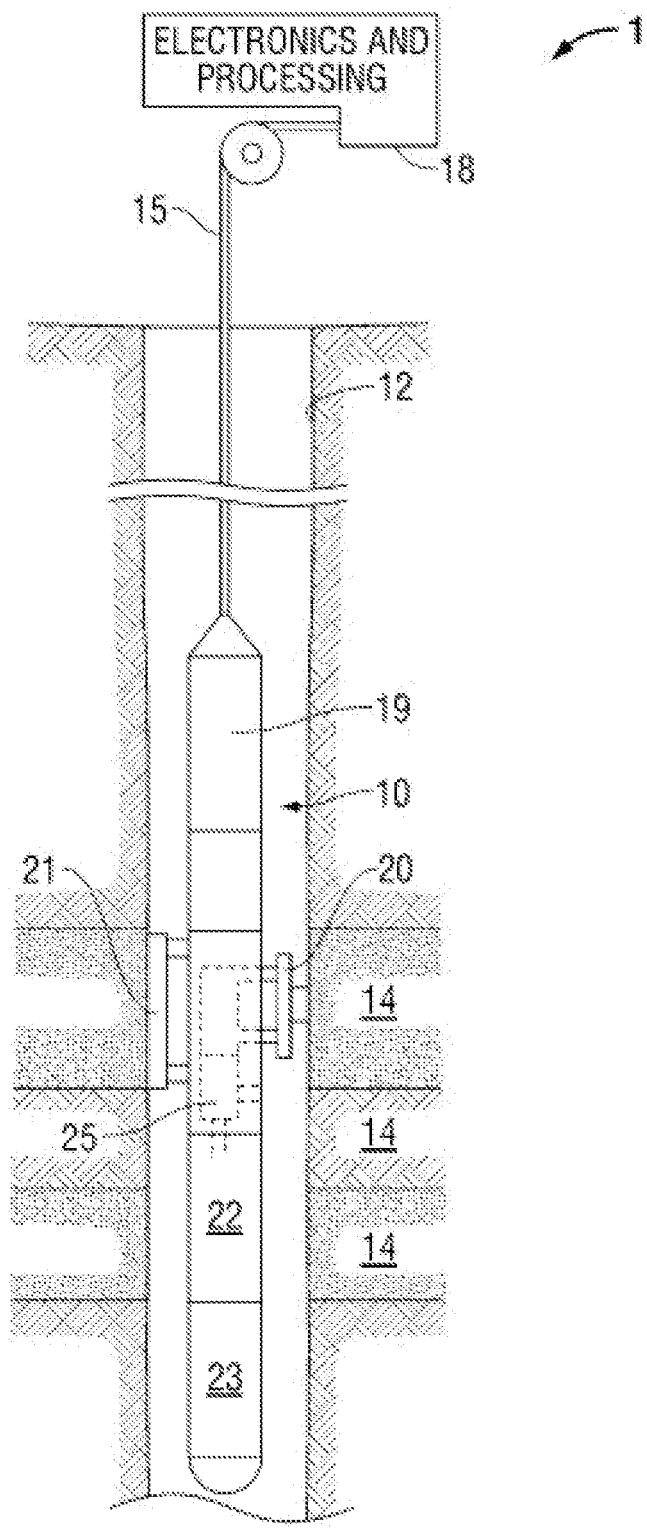
FIG. 1A is a schematic diagram of an embodiment of a petroleum reservoir fluid analysis tool that can be used as part of the methodology of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure relates to systems and methods for reservoir characterization, such as simulating asphaltene disequilibrium in reservoirs. Petroleum includes a complex mixture of hydrocarbons of various molecular weights, plus other organic compounds. The molecular composition of petroleum varies widely from formation to formation. The proportion of hydrocarbons in the mixture is highly variable and ranges from as much as 97 percent by weight in the lighter oils to as little as 50 percent in the heavier oils and bitumens. The hydrocarbons in petroleum are mostly alkanes (linear or branched), cycloalkanes, aromatic hydrocarbons, or more complicated chemicals like asphaltenes. The other organic compounds in petroleum may contain carbon dioxide ($CO_2$), nitrogen, oxygen, and sulfur, and trace amounts of metals such as iron, nickel, copper, and vanadium.

Petroleum may be characterized by SARA fractionation where asphaltenes are removed by precipitation with a paraffinic solvent and the deasphalted oil separated into saturates, aromatics, and resins by chromatographic separation.

Saturates include alkanes and cycloalkanes. The alkanes, also known as paraffins, are saturated hydrocarbons with straight or branched chains which contain only carbon and hydrogen and have the general formula $C_nH_{2n+2}$. They generally have from 5 to 40 carbon atoms per molecule, although trace amounts of shorter or longer molecules may be present in the mixture. The alkanes include methane ($CH_4$), ethane ($C_2H_6$), propane ($C_3H_8$), i-butane ($iC_4H_{10}$), n-butane ($nC_4H_{10}$), i-pentane ($iC_5H_{12}$), n-pentane ($nC_5H_{12}$), hexane ($C_6H_{14}$), heptane ($C_7H_{16}$), octane ($C_8H_{18}$), nonane ($C_9H_{20}$), decane ($C_{10}H_{22}$), hendecane ($C_{11}H_{24}$)—also referred to as endecane or undecane, dodecane ($C_{12}H_{26}$), tridecane ($C_{13}H_{28}$), tetradecane ($C_{14}H_{30}$), pentadecane ($C_{15}H_{32}$) and hexadecane ($C_{16}H_{34}$). The cycloalkanes, also known as napthenes, are saturated hydrocarbons which have one or more carbon rings to which hydrogen atoms are attached according to the formula $C_nH_{2n}$. Cycloalkanes have similar properties to alkanes but have higher boiling points. The cycloalkanes include cyclopropane ($C_3H_6$), cyclobutane ($C_4H_8$), cyclopentane ($C_5H_{10}$), cyclohexane ($C_6H_{12}$), and cycloheptane ($C_7H_{14}$).

The aromatic hydrocarbons are unsaturated hydrocarbons which have one or more planar six-carbon rings called benzene rings, to which hydrogen atoms are attached with the formula $C_nH_n$. They tend to burn with a sooty flame, and many have a sweet aroma. The aromatic hydrocarbons include benzene ($C_6H_6$) and derivatives of benzene, as well as polyaromatic hydrocarbons.

Resins are the most polar and aromatic species present in the deasphalted oil and, it has been suggested, contribute to the enhanced solubility of asphaltenes in crude oil by solvating the polar and aromatic portions of the asphaltenic molecules and aggregates.

Asphaltenes are insoluble in n-alkanes (such as n-pentane or n-heptane) and soluble in toluene. The C:H ratio is approximately 1:1.2, depending on the asphaltene source. Unlike most hydrocarbon constituents, asphaltenes contain a few percent of other atoms (called heteroatoms), such as sulfur, nitrogen, oxygen, vanadium, and nickel. Heavy oils and tar sands contain much higher proportions of asphaltenes than do medium-API oils or light oils. Condensates are virtually devoid of asphaltenes. As far as asphaltene structure is concerned, experts agree that some of the carbon and hydrogen atoms are bound in ring-like, aromatic groups, which also contain the heteroatoms. Alkane chains and cyclic alkanes contain the rest of the carbon and hydrogen atoms and are linked to the ring groups. Within this framework, asphaltenes exhibit a range of molecular weight and composition. Asphaltenes have been shown to have a distribution of molecular weight in the range of 300 to 1400 g/mol with an average of about 750 g/mol. This is compatible with a molecule contained seven or eight fused aromatic rings, and the range accommodates molecules with four to ten rings. It is also known that asphaltene molecules aggregate to form nanoaggregates and clusters.

Reservoir compartmentalization can be an impediment to efficient reservoir development. Reservoir compartmentalization is the natural occurrence of hydraulically isolated pockets within a reservoir. In order to produce a reservoir in an efficient manner, it is useful to know the structure of the rock and the level of compartmentalization. A reservoir compartment does not produce unless it is tapped by a well. In order to justify the drilling of a well, the reservoir compartment should be sufficiently large to sustain economic production. Furthermore, in order to achieve efficient recovery, it is generally desirable to know the locations of as many of the reservoir compartments as practical before extensive development has been done.

There are three industry standard procedures widely used to understand reservoir compartmentalization. First is the evaluation of petrophysical logs. Petrophysical logs may identify impermeable barriers, and the existence of such barriers can be taken to mean that the reservoir is compartmentalized. Examples include gamma ray and NMR logs, both of which can identify impermeable barriers in favorable situations. Another example is the evaluation of mud filtrate invasion monitored by resistivity logs. However, impermeable barriers may be so thin that they are not observable by these logs, or barriers observed by these logs may not extend away from the wellbore and therefore may not compartmentalize the reservoir. Second is the evaluation of pressure gradients. If two permeable zones are not in pressure communication, they are not in flow communication. However, the presumption that pressure communication implies flow communication has been repeatedly proven to be incorrect. Pressure equilibration uses relatively little fluid flow and can occur more than five orders of magnitude faster than fluid compositional equilibration, even in the presence of flow barriers. Continuous pressure gradients are a necessary but insufficient test for reservoir connectivity. Third is the comparison of geochemical fingerprints of fluid samples acquired from different locations in the reservoir. Petroleum is a complex chemical mixture, containing many different chemical compounds; the composition of that petroleum can therefore be treated as a fingerprint. If the composition of petroleum samples from two different places in the reservoir is the same, it is assumed that fluids can flow readily between those two places in the reservoir, and hence that the reservoir is connected. However, forces such as biodegradation and water washing can occur to different extents in different parts of the reservoir, causing two locations in the reservoir to have different fingerprints even if they are connected. Additionally, petroleum samples generated from the same source rock may have very similar fingerprints even if they come from locations in the reservoir that are presently disconnected.

An alternative method to assess connectivity is to evaluate hydrocarbon fluid compositional grading. The chemical composition of petroleum is different in different parts of a connected reservoir. This change in composition with position (such as with depth) in the reservoir is referred to as compositional grading. The magnitude of this compositional grading (i.e., the difference in the composition of two fluids collected from different depths), in connected reservoirs at thermodynamic equilibrium, can be measured with downhole fluid analysis and predicted with a mathematical equation of state (EOS) model. The EOS model is based on assumptions that the reservoir is connected and at thermodynamic equilibrium. If the magnitude of compositional grading as measured matches the predicted composition grading, then the assumptions of the EOS model are confirmed. In the event that the magnitude of the measured compositional grading does not match the predictions of the EOS model, it can be assumed that there is reservoir compartmentalization or that the reservoir fluids are not in equilibrium. Many different forces can contribute to a lack of thermodynamic equilibrium, such as tar mats, water washing, biodegradation, and real-time charging. It can be difficult to determine whether the reservoir is compartmentalized or in a state of thermodynamic non-equilibrium (e.g., disequilibrium), and this determination can be useful in development decisions.

More specifically, there is an increasing awareness that fluids are often heterogeneous in the reservoir and that reservoir fluids frequently demonstrate complicated fluid compositions, properties, and phase behaviors in single oil columns due to a variety of factors including gravity, thermal gradients, biodegradation, active charging, water washing, and phase transitions. Most of these mechanisms result in non-equilibrium or non-stationary state conditions acting on reservoir fluids and, often, these non-equilibrium factors dominate over diffusive and convective processes that can drive the fluids towards equilibrium. In these scenarios, the current modeling methods can be inaccurate and offer limited insight into the real compositional properties of the reservoir fluids. These limitations make it difficult to determine whether the reservoir is compartmentalized or connected, but in a state of non-equilibrium.

Understanding the distribution of asphaltene content in oil and in organic solids in reservoirs is useful for handling major production concerns, such as viscosity, flow assurance, reservoir connectivity, and tar/bitumen deposition. Advances in asphaltene science have enabled modeling of asphaltene gradients from first principles. In addition, downhole fluid analysis (DFA) provides an effective measurement of reservoir fluid gradients. In the disclosed embodiments, this combination of DFA measurement, the Yen-Mullins model of asphaltene, and the Flory-Huggins-Zuo (FHZ) equation of state (EOS) provides a unified workflow that has wide-ranging applicability.

The FHZ EOS quantitatively predicts the thermodynamic end state of a connected reservoir in the vertical dimension. However, if the DFA measurements and the concentration gradient predicted by the FHZ EOS do not match, then either the reservoir is not connected, or there are subsequent fluid migration processes ongoing and the reservoir simply has not had enough time to reach equilibrium. Many oil reservoirs exhibit thermodynamically equilibrated crude oils which are accurately represented by the FHZ EOS. However, there are many reservoirs which are undergoing dynamic processes in geologic time. The existing methodologies do not take into account the time variable. In addition, the formulism is established in the one-dimensional (1D) vertical dimension, thus horizontal gradients are not accounted for in reservoirs in disequilibrium. Thus, the capability to simulate asphaltene disequilibrium in connected reservoirs is highly useful.

The disclosed embodiments include a methodology which includes a DFA prediction workflow, and is capable of simulating the asphaltene dynamical segregation in geologic time in three dimensions (3D). The model used in the disclosed embodiments is established based on the general theory of thermodynamics of multicomponent mixtures in porous media, combined with the Flory-Huggins regular solution model of asphaltenes. In addition, the disclosed model takes into account 4 distinct mechanisms including Darcy's law, molecular diffusion, gravitational diffusion (gravity segregation), and thermal diffusion. It is noted that the gravitational diffusion is taken into account in the disclosed method because gravitational diffusion is the most pronounced mechanism for the heavy end of crude oil in reservoirs.

Using the disclosed methods combined with the DFA measurements enables assessment of whether the reservoir is connected but not in equilibrium or if the reservoir is compartmentalized. The disclosed simulation workflow thus aids in determining both compositional equilibrium and disequilibrium, reservoir compartmentalization, as well as correctly initializing reservoir production simulation, reserve estimation, and field development plan (FDP) strategies.

In certain embodiments, the reservoir characterization may include performing several steps. For example, a first step may include using a numerical model to simulate over geological time a non-equilibrium concentration of an asphaltene component as a function of location within the wellbore. A second step may include analyzing fluid samples acquired from at least one wellbore that traverses the reservoir of interest to measure concentration of the asphaltene component as a function of location within the wellbore. A third step may include comparing the non-equilibrium concentration of the asphaltene component as a function of location within the wellbore resulting from the simulation of the first step to the concentration of the asphaltene component as a function of location within the wellbore as measured in the second step. A fourth step may include characterizing the reservoir of interest based upon the comparing of the third step.

FIG. 1A illustrates an embodiment of a tool 10 for petroleum reservoir downhole fluid analysis that can be used as part of a workflow for reservoir analysis in accordance with present embodiments. The tool 10 is suspended in the borehole 12 from the lower end of a multiconductor cable 15 that is spooled in a usual fashion on a suitable winch on the earth's surface. The cable 15 is electrically coupled to an electrical control system 18 on the earth's surface. The tool 10 includes an elongated body 19 which carries a selectively extendable fluid admitting assembly 20 and a selectively extendable tool anchoring member 21 which are respectively arranged on opposite sides of the tool body 19. The fluid admitting assembly 20 is equipped for selectively sealing off or isolating selected portions of the wall of the borehole 12 such that fluid communication with the adjacent earth formation 14 is established. The fluid admitting assembly 20 and tool 10 include a flowline leading to a fluid analysis module 25. The formation fluid obtained by the fluid admitting assembly 20 flows through the flowline and through the fluid analysis module 25. The fluid may thereafter be expelled through a port or it may be sent to one or more fluid collecting chambers 22 and 23 which may receive and retain the fluids obtained from the formation. With the fluid admitting assembly 20 sealingly engaging the formation 14, a short rapid pressure drop can be used to break the mudcake seal. Normally, the first fluid drawn into the tool 10 will be highly contaminated with mud filtrate. As the tool 10 continues to draw fluid from the formation 14, the area near the fluid admitting assembly 20 cleans up and reservoir fluid becomes the dominant constituent. The time for cleanup depends upon many parameters, including formation permeability, fluid viscosity, the pressure differences between the borehole and the formation, and overbalanced pressure difference and its duration during drilling. Increasing the pump rate can shorten the cleanup time, but the rate is controlled carefully to preserve formation pressure conditions.

The fluid analysis module 25 includes means for measuring the temperature and pressure of the fluid in the flowline. The fluid analysis module 25 derives properties that characterize the formation fluid sample at the flowline pressure and temperature. In certain embodiments, the fluid analysis module 25 measures absorption spectra and translates such measurements into concentrations of several alkane components and groups (or lumps) in the fluid sample. In an illustrative embodiment, the fluid analysis module 25 provides measurements of the concentrations (e.g., weight percentages) of carbon dioxide ($CO_2$), methane ($CH_4$), ethane ($C_2H_6$), the C3-C5 alkane group, the lump of hexane and heavier alkane components (C6+), and asphaltene content. The C3-C5 alkane group includes propane, butane, and pentane. The C6+ alkane group includes hexane ($C_6H_{14}$), heptane ($C_7H_{16}$), octane ($C_8H_{18}$), nonane ($C_9H_{20}$), decane ($C_{10}H_{22}$), hendecane ($C_{11}H_{24}$)—also referred to as endecane or undecane, dodecane ($C_{12}H_{26}$), tridecane ($C_{13}H_{28}$), tetradecane ($C_{14}H_{30}$), pentadecane ($C_{15}H_{32}$), hexadecane ($C_{16}H_{34}$), etc. The fluid analysis module 25 also provides a means that measures live fluid density ($\rho$) at the flowline temperature and pressure, live fluid viscosity ($\mu$) at flowline temperature and pressure (in cp), formation pressure, and formation temperature.

Control system 18 maintains control of the fluid admitting assembly 20 and fluid analysis module 25 and the flow path to the fluid collecting chambers 22, 23. The fluid analysis module 25 and the surface-located electrical control system 18 may include data processing functionality (e.g., one or more microprocessors, associated memory, and other hardware and/or software) to implement the disclosed embodiments as described herein. The electrical control system 18 can also be realized by a distributed data processing system wherein data measured by the tool 10 is communicated (such as in real time) over a communication link (such as a satellite link) to a remote location for data analysis as described herein. The data analysis can be carried out on a workstation or other suitable data processing system (such as a computer cluster or computing grid).

Formation fluids sampled by the tool 10 may be contaminated with mud filtrate. That is, the formation fluids may be contaminated with the filtrate of a drilling fluid that seeps into the formation 14 during the drilling process. Thus, when fluids are withdrawn from the formation 14 by the fluid admitting assembly 20, they may include mud filtrate. In some examples, formation fluids are withdrawn from the formation 14 and pumped into the borehole or into a large waste chamber in the tool 10 until the fluid being withdrawn becomes sufficiently clean. A clean sample is one where the concentration of mud filtrate in the sample fluid is acceptably low so that the fluid substantially represents native (i.e., naturally occurring) formation fluids. In the illustrated example, the tool 10 is provided with fluid collecting chambers 22 and 23 to store collected fluid samples.

The tool 10 of FIG. 1A is adapted to make in situ determinations regarding hydrocarbon-bearing geological formations by downhole sampling of reservoir fluid at one or more measurement stations within the borehole 12, and by conducting downhole fluid analysis of one or more reservoir fluid samples for each measurement station (including compositional analysis such as estimating concentrations of a plurality of compositional components of a given sample and other fluid properties).

Figure 1B:
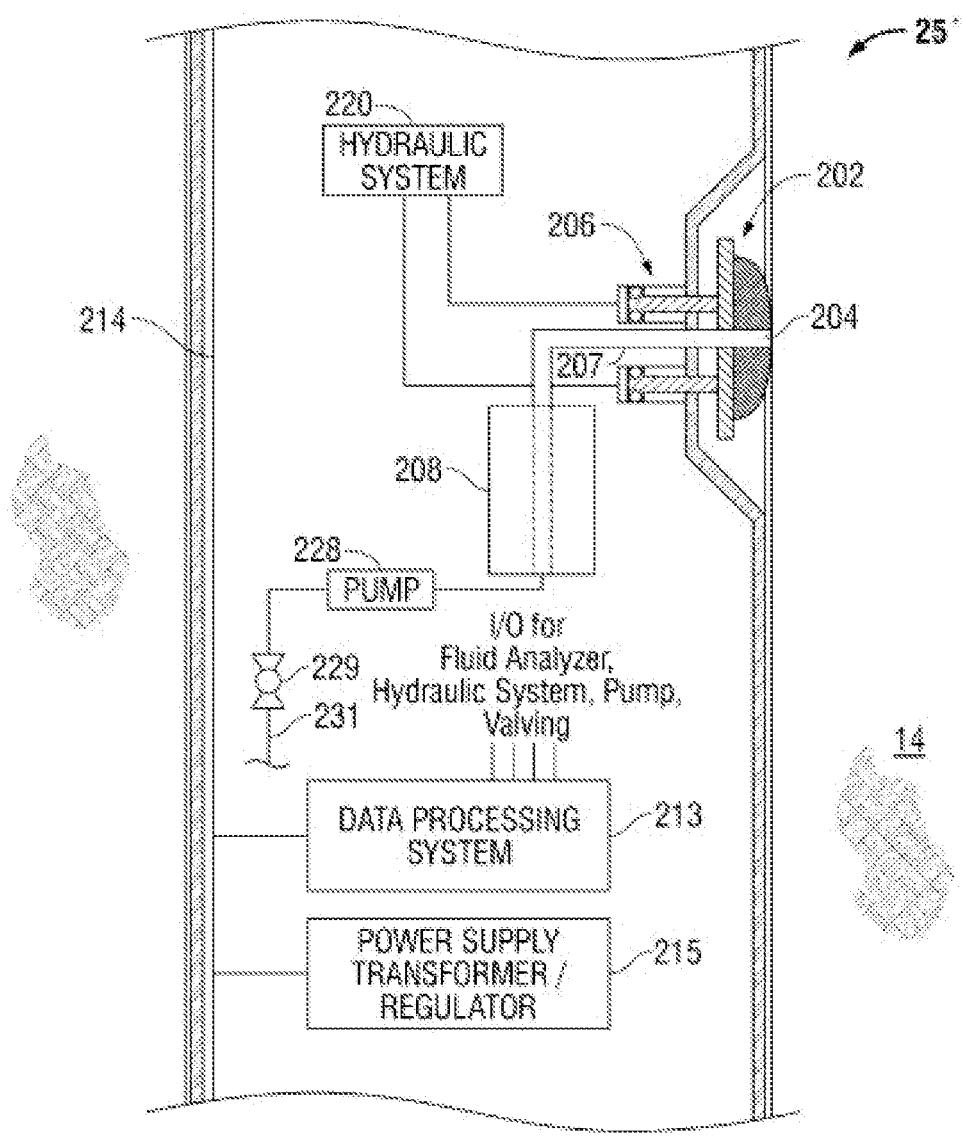
FIG. 1B is a schematic diagram of an embodiment of a fluid analysis module suitable for use in the tool of FIG. 1A.

FIG. 1B illustrates an embodiment of the fluid analysis module 25 of FIG. 1A (labeled 25'), including a probe 202 having a port 204 to admit formation fluid therein. A hydraulic extending mechanism 206 may be driven by a hydraulic system 220 to extend the probe 202 to sealingly engage the formation 14. In alternative implementations, more than one probe can be used, or inflatable packers can replace the probe(s) and function to establish fluid connections with the formation and sample fluid samples.

The probe 202 can be realized by the Quicksilver Probe available from Schlumberger Technology Corporation of Sugar Land, Tex., USA. In other embodiments, the probe 202 may be replaced or supplemented with other types of suitable probes. The Quicksilver Probe divides the fluid flow from the reservoir into two concentric zones, a central zone isolated from a guard zone about the perimeter of the central zone. The two zones are connected to separate flowlines with independent pumps. The pumps can be run at different rates to exploit filtrate/fluid viscosity contrast and permeability anistrotropy of the reservoir. Higher intake velocity in the guard zone directs contaminated fluid into the guard zone flowline, while clean fluid is drawn into the central zone. Fluid analyzers analyze the fluid in each flowline to determine the composition of the fluid in the respective flowlines. The pump rates can be adjusted based on such compositional analysis to achieve and maintain desired fluid contamination levels. The operation of the Quicksilver Probe efficiently separates contaminated fluid from cleaner fluid early in the fluid extraction process, which results in obtaining clean fluid in much less time compared to traditional formation testing tools.

The fluid analysis module 25' includes a flowline 207 that carries formation fluid from the port 204 through a fluid analyzer 208. The fluid analyzer 208 includes a light source that directs light to a sapphire prism disposed adjacent the flowline fluid flow. The reflection of such light is analyzed by a gas refractometer and dual fluoroscene detectors. The gas refractometer qualitatively identifies the fluid phase in the flowline. At the selected angle of incidence of the light emitted from the diode, the reflection coefficient is much larger when gas is in contact with the window than when oil or water is in contact with the window. The dual fluoroscene detectors detect free gas bubbles and retrograde liquid dropout to accurately detect single phase fluid flow in the flowline 207. Fluid type is also identified. The resulting phase information can be used to define the difference between retrograde condensates and volatile oils, which can have similar gas-oil ratios (GORs) and live oil densities. It can also be used to monitor phase separation in real time and ensure single phase sampling. The fluid analyzer 208 also includes dual spectrometers—a filter array spectrometer and a grating-type spectrometer.

The filter array spectrometer of the analyzer 208 includes a broadband light source providing broadband light that passes along optical guides and through an optical chamber in the flowline 207 to an array of optical density detectors that are designed to detect narrow frequency bands (commonly referred to as channels) in the visible and near-infrared spectra as described in U.S. Pat. No. 4,994,671, incorporated herein by reference in its entirety. These channels include a subset of channels that detect water absorption peaks (which are used to characterize water content in the fluid) and a dedicated channel corresponding to the absorption peak of $CO_2$ with dual channels above and below this dedicated channel that subtract out the overlapping spectrum of hydrocarbon and small amounts of water (which are used to characterize $CO_2$ content in the fluid). The filter array spectrometer also employs optical filters that provide for identification of the color (also referred to as "optical density" or "OD") of the fluid in the flowline. Such color measurements support fluid identification, determination of asphaltene content and pH measurement. Mud filtrates or other solid materials generate noise in the channels of the filter array spectrometer. Scattering caused by these particles is independent of wavelength. In certain embodiments, the effect of such scattering can be removed by subtracting a nearby channel.

The grating-type spectrometer of the fluid analyzer 208 is designed to detect channels in the near-infrared spectra (such as between 1600 and 1800 nm) where reservoir fluid has absorption characteristics that reflect molecular structure.

The fluid analyzer 208 also includes a pressure sensor for measuring pressure of the formation fluid in the flowline 207, a temperature sensor for measuring temperature of the formation fluid in the flowline 207, and a density sensor for measuring live fluid density of the fluid in the flowline 207. In certain embodiments, the density sensor is realized by a vibrating sensor that oscillates in two perpendicular modes within the fluid. Simple physical models describe the resonance frequency and quality factor of the sensor in relation to live fluid density. Dual mode oscillation is advantageous over other resonant techniques because it minimizes the effects of pressure and temperature on the sensor through common mode rejection. In addition to density, the density sensor can also provide a measurement of live fluid viscosity from the quality factor of oscillation frequency. Note that live fluid viscosity can also be measured by placing a vibrating object in the fluid flow and measuring the increase in line width of any fundamental resonance. This increase in line width is related closely to the viscosity of the fluid. The change in frequency of the vibrating object is closely associated with the mass density of the object. If density is measured independently, then the determination of viscosity is more accurate because the effects of a density change on the mechanical resonances are determined. Generally, the response of the vibrating object is calibrated against known standards. The fluid analyzer 208 can also measure resistivity and pH of fluid in the flowline 207. In certain embodiments, the fluid analyzer 208 is realized by the InSitu Fluid Analyzer available from Schlumberger Technology Corporation. In other embodiments, the flowline sensors of the fluid analyzer 208 may be replaced or supplemented with other types of suitable measurement sensors (e.g., NMR sensors and capacitance sensors). Pressure sensor(s) and/or temperature sensor(s) for measuring pressure and temperature of fluid drawn into the flowline 207 can also be part of the probe 202.

A pump 228 is fluidly coupled to the flowline 207 and is controlled to draw formation fluid into the flowline 207 and to supply formation fluid to the fluid collecting chambers 22 and 23 (FIG. 1A) via valve 229 and flowpath 231 (FIG. 1B).

The fluid analysis module 25' includes a data processing system 213 that receives and transmits control and data signals to the other components of the module 25' for controlling operations of the module 25'. The data processing system 213 also interfaces to the fluid analyzer 208 for receiving, storing, and processing the measurement data generated therein. In the certain embodiments, the data processing system 213 processes the measurement data output by the fluid analyzer 208 to derive and store measurements of the hydrocarbon composition of fluid samples analyzed in situ by the fluid analyzer 208, including: flowline temperature; flowline pressure; live fluid density ($\rho$) at the flowline temperature and pressure; live fluid viscosity ($\mu$) at flowline temperature and pressure; concentrations (e.g., weight percentages) of carbon dioxide ($CO_2$), methane ($CH_4$), ethane ($C_2H_6$), the C3-C5 alkane group, the lump of hexane and heavier alkane components (C6+), and asphaltene content; GOR; and possibly other parameters (such as API gravity and oil formation volume factor (Bo)).

Flowline temperature and pressure are measured by the temperature sensor and pressure sensor, respectively, of the fluid analyzer 208 (and/or probe 202). In one embodiment, the output of the temperature sensor(s) and pressure sensor(s) are monitored continuously before, during, and after sample acquisition to derive the temperature and pressure of the fluid in the flowline 207. The formation temperature is not likely to deviate substantially from the flowline temperature at a given measurement station and thus can be estimated as the flowline temperature at the given measurement station in many applications. Formation pressure can be measured by the pressure sensor of the fluid analyzer 208 in conjunction with the downhole fluid sampling and analysis at a particular measurement station after buildup of the flowline to formation pressure.

Live fluid density ($\rho$) at the flowline temperature and pressure is determined by the output of the density sensor of the fluid analyzer 208 at the time the flowline temperature and pressure are measured.

Live fluid viscosity ($\mu$) at flowline temperature and pressure is derived from the quality factor of the density sensor measurements at the time the flowline temperature and pressure are measured.

The measurements of the hydrocarbon composition of fluid samples are derived by translation of the data output by spectrometers of the fluid analyzer 208.

The GOR is determined by measuring the quantity of methane and liquid components of crude oil using near-infrared absorption peaks. The ratio of the methane peak to the oil peak on a single phase live crude oil is directly related to GOR.

The fluid analysis module 25' can also detect and/or measure other fluid properties of a live oil sample, including retrograde dew formation, asphaltene precipitation, and/or gas evolution.

The fluid analysis module 25' also includes a tool bus 214 that communicates data signals and control signals between the data processing system 213 and the surface-located control system 18 of FIG. 1A. The tool bus 214 can also carry electrical power supply signals generated by a surface-located power source for supply to the fluid analysis module 25', and the module 25' can include a power supply transformer/regulator 215 for transforming the electric power supply signals supplied via the tool bus 214 to appropriate levels suitable for use by the electrical components of the module 25'.

Although the data processing components of FIG. 1B are shown and described above as being communicatively coupled and arranged in a particular configuration, the components of the fluid analysis module 25' can be communicatively coupled and/or arranged differently than depicted in FIG. 1B without departing from the scope of the present disclosure. In addition, the example methods, apparatus, and systems described herein are not limited to a particular conveyance type but, instead, may be implemented in connection with different conveyance types including, for example, coiled tubing, wireline, wired drill pipe, and/or other conveyance means known in the industry.

Figure 2A:
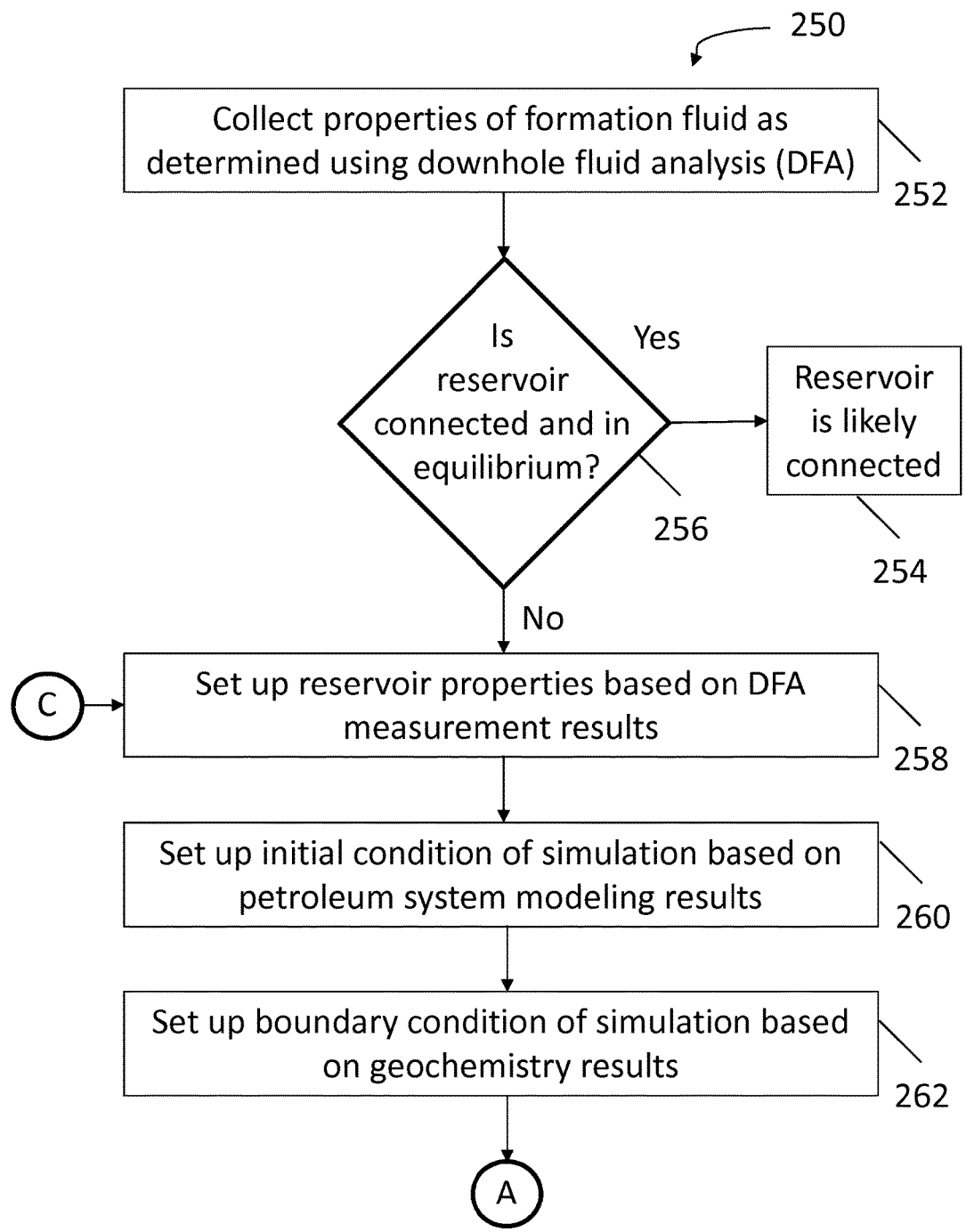
FIGS. 2A-2C, collectively, are a flow chart of an embodiment of data analysis operations that are part of the workflow for reservoir analysis in accordance with the present disclosure.
Figure 2B:
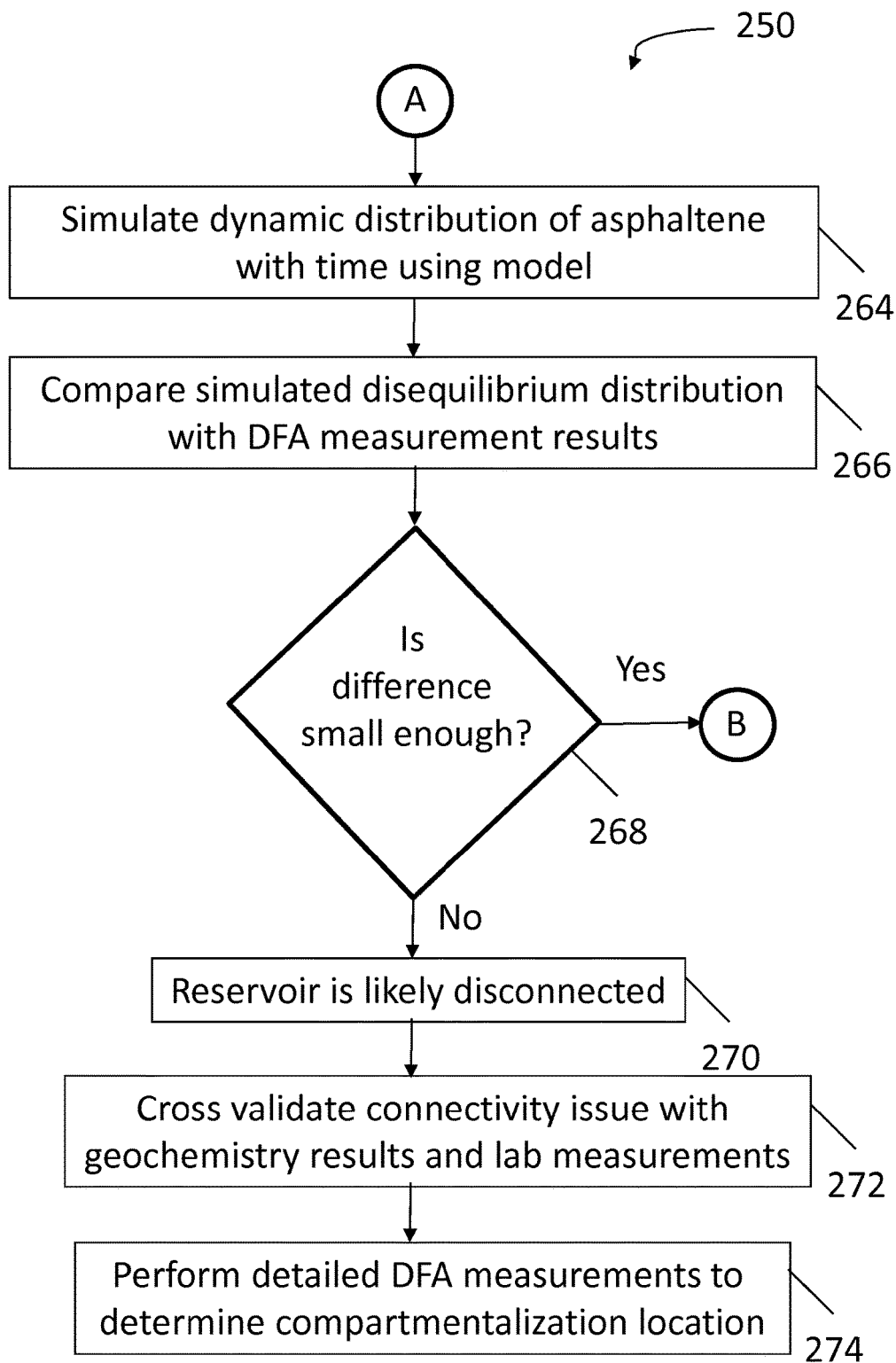
Figure 2C:
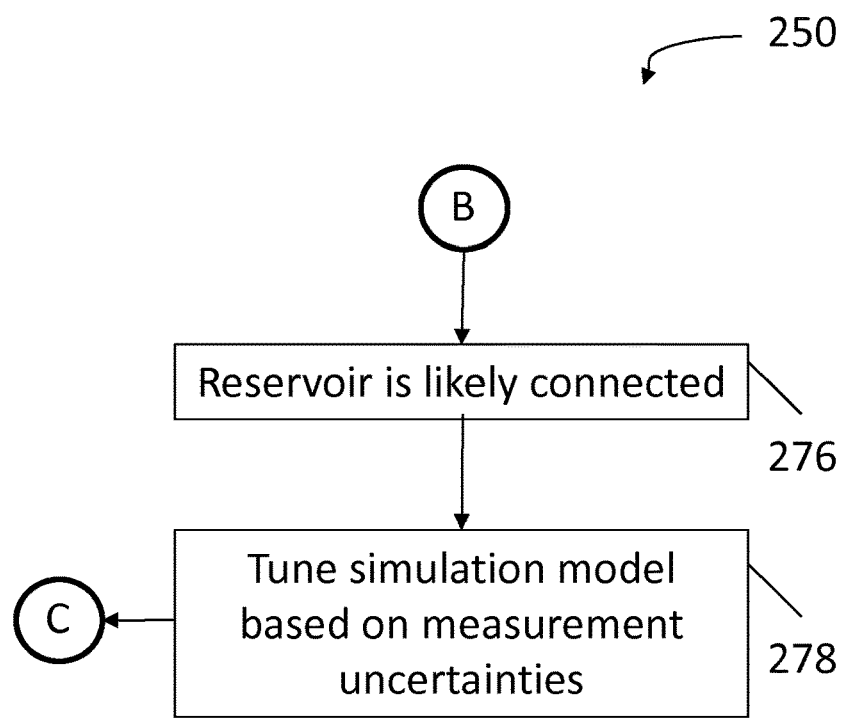

In accordance with the disclosed embodiments, the tool 10 of FIGS. 1A and 1B can be employed as part of the methodology 250 of FIGS. 2A-2C to evaluate a petroleum reservoir of interest. The surface-located electrical control system 18 and the fluid analysis module 25 of the tool 10 each include data processing functionality (e.g., one or more microprocessors, associated memory, and other hardware and/or software) that cooperate to implement the method 250 and embodiments as described herein. Specifically, the control system 18 and/or the module 25 may include machine readable instructions disposed on a memory device (e.g., stored within circuitry of the control system 18 and/or module 25 or within a separate memory or other tangible readable medium) and the instructions may monitor or control operations of the downhole tool 10 to implement the method 250. The electrical control system 18 can also be realized by a distributed data processing system wherein data measured by the tool 10 is communicated in real time over a communication link (such as a satellite link) to a remote location for data analysis as described herein. The data analysis can be carried out on a workstation or other suitable data processing system (such as a computer cluster or computing grid).

The operations of FIGS. 2A-2C begin in step 252 by employing the tool 10 of FIGS. 1A and 1B to obtain a sample of the formation fluid at the reservoir pressure and temperature (a live oil sample) at a measurement station in the wellbore (for example, a reference station), and the sample is processed in the downhole environment by the fluid analysis module 25. In the certain embodiments, the fluid analysis module 25 conducts downhole fluid analysis (DFA) of the formation fluid by performing spectrophotometry measurements that measure absorption spectra of the live oil sample and translates such spectrophotometry measurements into concentrations of several alkane components and groups (or lumps) in the fluids of interest. In an illustrative embodiment, the fluid analysis module 25 provides measurements of the concentrations (e.g., weight percentages) of carbon dioxide ($CO_2$), methane ($CH_4$), ethane ($C_2H_6$), the C3-C5 alkane group including propane, butane, pentane, the lump of hexane and heavier alkane components (C6+), and asphaltene content. The tool 10 also provides a means to measure temperature of the fluid sample (and thus reservoir temperature at the station), pressure of the fluid sample (and thus reservoir pressure at the station), live fluid density of the fluid sample, live fluid viscosity of the fluid sample, gas-oil ratio (GOR) of the fluid sample, optical density, and possibly other fluid properties (such as API gravity, formation volume fraction (Bo), retrograde dew formation, asphaltene precipitation, and gas evolution) of the fluid sample.

As part of step 252, the tool 10 can also be controlled to collect and store one or more isolated live oil samples in fluid collecting chambers 22, 23 (FIG. 1A) of the tool 10. The respective live oil sample is collected at reservoir conditions (at the formation temperature and pressure) for the measurement station and stored within a sealed sample container at these conditions for transport uphole to the wellsite when the tool is withdrawn from the wellbore.

As part of step 252, isolated core samples can also be acquired by the tool 10 and stored within the tool 10 for transport uphole to the wellsite when the tool is withdrawn from the wellbore. Alternatively, a separate coring tool can be used to acquire isolated core sample from the wellbore. There are several types of core samples that can be recovered from the wellbore, including full diameter cores, oriented cores, native state cores, and sidewall cores. Coring operations can be run in combination with other suitable logging operations (such as gamma ray logging) to correlate with openhole logs for accurate, real time depth control of the coring points.

In step 256, the DFA FHZ workflow is used to evaluate whether the reservoir is both connected and in equilibrium. A number of references disclose the use of the FHZ methodology, such as, but not limited to, U.S. Pat. No. 7,996,154, U.S. Publication No. 2009/0312997, U.S. Publication No. 2012/0296617, U.S. Publication No. 2014/0200810, each of which is incorporated herein by reference in its entirety. In certain embodiments, the FHZ EOS may be expressed as follows:

$$\frac{OD(h_2)}{OD(h_1)} = \frac{\phi_a(h_2)}{\phi_a(h_1)} = \exp\left\{\frac{v_a g(\rho - \rho_a)(h_2 - h_1)}{RT} + \frac{v_a}{RT}\left[(\delta_a - \delta)_{h_1}^2 - (\delta_a - \delta)_{h_2}^2\right] + \left[\left(\frac{v_a}{v}\right)_{h_2} - \left(\frac{v_a}{v}\right)_{h_1}\right]\right\} \quad (1)$$

where
$\phi_a(h_1)$ is the volume fraction for asphaltene at depth $h_1$,
$\phi_a(h_2)$ is the volume fraction for asphaltene at depth $h_2$,
$OD(h_1)$ is the optical density for asphaltene at depth $h_1$,
$OD(h_2)$ is the optical density for asphaltene at depth $h_2$,
$v_a$ is the partial molar volume for the asphaltene,
$v$ is the molar volume for the bulk fluid,
$g$ is the gravitational acceleration,
$\delta_a$ is the solubility parameter for the asphaltene,
$\delta$ is the solubility parameter for the bulk fluid,
$\rho_a$ is the density for the asphaltene,
$\rho$ is the density for the bulk fluid,
R is the universal gas constant, and
T is the absolute temperature of the reservoir fluid.

The equation of state (EOS) model describes the thermodynamic behavior of the fluid and provides for characterization of the reservoir fluid at different locations within the reservoir. With the reservoir fluid characterized with respect to its thermodynamic behavior, fluid production parameters, transport properties, and other commercially useful indicators of the reservoir can be computed.

For example, the EOS model can provide the phase envelope that can be used to interactively vary the rate at which samples are collected in order to avoid entering the two phase region. In another example, the EOS can provide useful properties in assessing production methodologies for the reservoir. Such properties can include density, viscosity, and volume of gas formed from a liquid after expansion to a specified temperature and pressure. The characterization of the fluid sample with respect to its thermodynamic model can also be used as a benchmark to determine the validity of the obtained sample, whether to retain the sample, and/or whether to obtain another sample at the location of interest. More particularly, based on the thermodynamic model and information regarding formation pressures, sampling pressures, and formation temperatures, if it is determined that the fluid sample was obtained near or below the bubble point line of the sample, a decision may be made to jettison the sample and/or to obtain another sample at a slower rate (i.e., a smaller pressure drop) so that gas will not evolve out of the sample. Alternatively, because knowledge of the dew point of a retrograde gas condensate in a formation is desirable, a decision may be made (when conditions allow) to vary the pressure drawdown in an attempt to observe the liquid condensation and thus establish the actual saturation pressure.

For example, if the DFA measurements and the vertical concentration gradient predicted by the FHZ EOS do not match, then either the reservoir is not connected, or there are subsequent fluid migration processes ongoing and the reservoir has not had enough time to reach equilibrium. In addition, if the results of the DFA FHZ workflow indicate a horizontal gradient, then either the reservoir is not connected or in disequilibrium. If either situation (e.g., vertical gradient not matching or horizontal gradient), then the method 250 proceeds to step 258. Otherwise, the method 250 proceeds to step 254, which indicates that the reservoir is likely connected.

Steps 258, 260, and 262 of the method 250 are conducted in preparation for simulating the dynamic distribution of asphaltene in the reservoir. Specifically, in step 258, reservoir properties based on the DFA measurement results are set up. Examples of these reservoir properties include, but are not limited to, depth, length, permeability, porosity, and viscosity. In step 260, the initial condition of the simulation based on the petroleum system modeling results is set up. In step 262, the boundary condition of the simulation based on the geochemistry results is set up. For example, if there is no gas charge present in the reservoir, then a zero flux boundary condition is used. Otherwise, a gas influx boundary condition is used in step 262.

In step 264, the dynamic distribution of asphaltene with time is simulated using a dynamic asphaltene distribution model, the derivation of which is described in detail below. The general governing equations for a multicomponent fluid system are as follows. Darcy's velocity of an average fluid is given by:

$$u = -\frac{k}{\phi\mu}(\Delta P - \rho g \nabla z) \quad (2)$$

where u is the pore velocity vector, $\Phi$ is the porosity, k, $\mu$, P, $\rho$ are the fluid permeability, viscosity, pressure, and mass density, respectively, g is the gravitational constant, z is the depth pointing downward, and $\nabla$ is the gradient operator. The conservation of mass (without source/sink term) is given by:

$$\frac{\partial \rho}{\partial t} + \nabla \cdot (\rho u) = 0 \quad (3)$$

where $\nabla$ is the divergence operator, $$\nabla \cdot u = \frac{\partial u_1}{\partial x_1} + \frac{\partial u_2}{\partial x_2} + \frac{\partial u_3}{\partial x_3}.$$

The mass conservation of each component is expressed as:

$$\frac{\partial(w_i \rho)}{\partial t} + \nabla \cdot (w_i \rho u + J_i) = 0, i = 1, \ldots, N_C \quad (4)$$

where $w_i$ is the weight fraction of component i. The mass flux $J_i$ vector has 3 terms: molecular diffusion, gravity diffusion, and temperature diffusion:

$$J_i = -\rho(\Sigma_j D_{ij}^M \nabla x_j + D_i^G \nabla P + D_i^T \nabla T) \quad (5)$$

where $D_{ij}^M$, $D_i^G$, and $D_i^T$ are the corresponding diffusion tensors, the latter two are diagonal, and $x_i$ is the mole fraction of component i.

Equations (2) to (5) complete the general governing equations that can solve a large variety of multicomponent mixture transportation problems, which takes into account four distinct mechanisms that impact the composition variation: (a) molecular diffusion is the tendency to mix fluids due to concentration gradient; (b) gravity diffusion is the tendency to separate components with different molar mass due to earth's gravity, so that heavier components segregate towards the bottom and lighter components segregate towards the top; (c) thermal diffusion is the counter effect of gravity, with the tendency to separate components due to earth's geothermal gradient, since temperature is a measure of the kinetic energy of molecules, in an ideal mixture lighter molecules find it easier to move towards regions with lower temperature; and (d) convection is the convective flow caused by density gradient. The gravity diffusion and thermal diffusion mainly affect the vertical gradient, while convection mainly affects the horizontal gradient.

Although the diffusive flux $J_i$ has a general formulism, it includes the phenomenological coefficients and is difficult to be analyzed for a specific reservoir problem. To assess the asphaltene gradient distribution with time, a composition lumping strategy is used. The reservoir fluid can be treated as a mixture of two groups of multicomponents: a solvent group (non-asphaltene components or maltene) and a solute group (asphaltenes). Of course, the solvent is also a mixture whose properties are calculated by an EOS. In the following discussion, we restrict our study to a binary mixture, however, the application of the disclosed method to binary mixtures is a non-limiting example and the disclosed method may be used for various multicomponent mixture systems as well. The subscripts 1 or 2 represent the property corresponding to component 1 or component 2. For such case the asphaltene diffusive flux is expressed as:

$$J_1 = -\frac{M_1 M_2}{M^2} D_{12} \rho \left( \frac{\partial \ln f_1}{\partial \ln x_1} \bigg|_{P,T} \nabla x_1 + \frac{x_1}{RT} \left( \frac{M_1}{\rho} - \overline{V}_1 \right) \nabla P + K_T \nabla \ln T \right) \quad (6)$$

where M and $M_i$ represents molecular weight, $D_{12}$ is the molecular diffusion coefficient of components 1 and 2, f is the fugacity, $\overline{V}_1$ is the partial molar volume of component 1, and $K_T$ is the thermal diffusion ratio, respectively. For an isothermal system, the temperature gradient term vanishes; and for large species like asphaltenes, $\overline{V}_1 \approx V_1$ which is the asphaltene molar volume. Denoting the density difference $\Delta\rho = \rho_1 - \rho$, combining equations (4) and (6) yields the conservation of component 1:

$$\frac{\partial(w_1 \rho)}{\partial t} + \quad (7)$$

$$\nabla \cdot \left( w_1 \rho u - \frac{M_1 M_2}{M^2} D_{12} \rho \left( \frac{\partial \ln f_1}{\partial \ln x_1} \bigg|_{P,T} \nabla x_1 + \frac{\Delta \rho x_1 v_1}{\rho RT} \nabla P \right) \right) = 0$$

The mixture molar mass M, density $\rho$ (thus $\Delta\rho$) and component weight fraction $w_1$ can be expressed in terms of mole fraction $x_1$ and molar volume V:

$$M = (M_1 - M_2)x_1 + M_2, w_1 = \frac{x_1 M_1}{M} \quad (8)$$

$$\rho = \frac{M}{V}, \Delta\rho = \rho_1 - \frac{M}{V} \quad (9)$$

Thus, equation (7) can be expressed using molar properties as:

$$\frac{\partial(x_1/V)}{\partial t} + \nabla \cdot \left( \frac{x_1 u}{V} - \frac{M_2}{MV} D_{12} \left( \frac{\partial \ln f_1}{\partial \ln x_1} \bigg|_{P,T} \nabla x_1 + \frac{\Delta \rho x_1 V_1}{\rho RT} \nabla P \right) \right) = 0 \quad (10)$$

For a non-ideal solution, such as most reservoir fluids, the issue that remains is to evaluate fugacity using an EOS.

Particularly for asphaltenes, it can be evaluated by the multicomponent Flory-Huggins regular solution model:

$$\frac{d\mu|_{P,T}}{RT} = d\ln f_1 |_{P,T} = d\left(\ln\phi_1 - \frac{V_1}{V} + \frac{V_1(\delta_1 - \delta)^2}{RT}\right) \quad (11)$$

where $\phi_1$ is the asphaltene volume fraction, $\delta$ and $\delta_1$ are mixture and asphaltene solubility. The asphaltene and solvent solubility are defined by:

$$\delta_1 = \sqrt{A\rho}, \delta_2 = \sqrt{\frac{\Delta H^{vap} - RT}{V_2}} \quad (12)$$

where A is the monomer heat of vaporization in units of kJ/g and $\Delta H^{vap}$ is the heat of vaporization as reported in the literature, respectively. Values for the asphaltene solubility can be estimated by, e.g. $\delta_1 = 21.85(1-1.07\times 10^{-3}(T-T_0))$ $MPa^{0.5}$ where $T_0$ is room temperature, and for bulk oil, $\delta$ may vary from 10 to 17 $MPa^{0.5}$ depending on reservoir oil type. The mixture solubility can be estimated by, e.g. $\delta = 17.347\rho + 2.904$ based on lab correlations. More detailed analysis and considerations on the magnitude and dependencies of the parameters and terms in the FHZ EOS, namely gravity, solubility, and entropy, as presented by Freed, Mullins, and Zuo in "Heuristics for Equilibrium Distributions of Asphaltenes in the Presence of GOR Gradients," *Energy Fuels*, Vol. 28, No. 8, pp. 4859-4869, 2014, may be used to aid in parameters determination. The mixing rule for volume fraction and solubility is given by:

$$\phi_1 = \frac{x_1 V_1}{x_1 V_1 + x_2 V_2}, \delta = \phi_1 \delta_1 + (1-\phi_1)\delta_2 \quad (13)$$

With some derivative calculations using equations (9), (10), and (13), it is derived that:

$$\gamma^{FH} \equiv \frac{\partial \ln f_1}{\partial \ln x_1}\bigg|_{P,T} = \quad (14)$$

$$\frac{V_2}{x_1 V_1 + x_2 V_2} + \frac{x_1 V_1}{V^2}\frac{\partial V}{\partial x_1} - \frac{2V_1 V_2 \phi_1 \phi_2 (\delta_1 - \delta_2)^2}{RT(x_1 V_1 + x_2 V_2)}$$

where $\gamma^{FH}$ includes both the entropy and solubility terms that come from the non-ideality of reservoir fluids. The molar volume V and its derivative can be calculated using a cubic EOS, such as Peng-Robinson 1976, or Redlich-Kwong-Soave 1972, and volume deficiency can be corrected by the volume translation method (Peneloux 1982). Particularly, if additive volume is assumed, then the mixture molar volume can be evaluated by $V=(V_1-V_2)x_1+V_2$, and $$\frac{\partial V}{\partial x_1} = V_1 - V_2,$$

and in this case $\gamma^{FH}$ becomes:

$$\gamma^{FH} = 1 + \frac{(V_1 - V)(V - V_2)}{V^2} - \frac{2V_1 V_2 \phi_1 \phi_2 (\delta_1 - \delta_2)^2}{RTV} \quad (15)$$

which can be directly calculated without a cubic EOS. For the special case of an ideal solution, the fugacity is related with mole fraction by $d\ln f_1|_{P,T} = d\ln x_1$, in this case:

$$\gamma^{FH} = 1 \quad (16)$$

Thus, only the gravity term will be taken into account. This simplification can be used for heavy oil because in heavy oil, the gravity term dominates the other two terms. With the resolution of $\gamma^{FH}$, now equation (10) becomes:

$$\boxed{\frac{\partial(x_1/V)}{\partial t} + \nabla \cdot \left(\frac{x_1 u}{V} - \frac{M_2}{MV}D_{12}\left(\gamma^{FH}\nabla x_1 + \frac{\Delta \rho x_1 V_1}{\rho RT}\nabla P\right)\right) = 0} \quad (17)$$

where the Darcy velocity u, mixture molar mass M, the density difference $\Delta\rho$ and non-ideality terms $\gamma^{FH}$ are given by equations (2), (8), (9), and (15). Equation (17) is referred to as the FHZ equation of dynamics for asphaltenes, which describes the dynamical process of asphaltene gravitational diffusion and advection. The driving forces are Darcy's advection velocity term, entropy term, solubility term, and gravity term.

The relationship between the dynamical equation (17) and the thermodynamic FHZ EOS is that, at the equilibrium state, both the bulk velocity u and diffusive flux $J_1$ in equation (17) become 0, which yields:

$$\frac{1}{RT}\frac{\partial \mu}{\partial z}\bigg|_{P,T} = \frac{\partial \ln f_1}{\partial z}\bigg|_{P,T} = \frac{d\left(\ln\phi_1 - \frac{V_1}{V} + \frac{V_1(\delta_1 - \delta)^2}{RT}\right)}{dz} = \frac{\Delta \rho g V_1}{RT} \quad (18)$$

Equation (18) is equivalent to the FHZ EOS at equilibrium. However, using (17), the disequilibrium (i.e., the dynamic variation with time) can be resolved. Combining equation (17) with the mass conservation of bulk fluid expressed by equation (3), the two variables to be solved are the mole fraction $x_1$ and pressure P. By solving these two equations we can simulate the composition variation with time in 3D. The initial condition is set up based on petroleum system modeling results, and the zero mass flux boundary condition is used if there is no current gas charge. Otherwise a gas influx from the top can be used as boundary condition. The molar properties of asphaltene in various crude oils is resolved by the Yen-Mullins model, and can be directly used in the simulation. Note that viscosity is not assumed constant and its variation with time can also be simulated, e.g. using the Lohrenz-Bray-Clark correlation (1964). The mixture molar volume V and thus mixture density is estimated by the cubic equation of state. It should be noted that if there is dramatic temperature gradient in the reservoir under evaluation, then the reservoir is by definition not equilibrated. In this case, the temperature term in equation (6) can be added to the simulation to properly account for the thermal diffusion.

In step 266, the simulated disequilibrium distribution from step 264 is compared with the DFA measurement results obtained in step 252. In step 268, the difference from step 266 is compared with a threshold value to indicate whether the difference is small enough. If the difference is small enough (e.g., the difference is less than the threshold value), then the reservoir is likely connected (step 276). In this situation, the simulation model may be tuned based on measurement uncertainties and the method 250 repeated by going to step 258. Alternatively, if the difference is large (e.g., the difference is greater than the threshold value), then the reservoir is likely disconnected (step 270). For example, the reservoir may include a baffle or fault. In this situation, the connectivity issue may be cross validated with the geochemistry results and lab measurements in step 272. In addition, detailed DFA measurements may be performed to determine the compartmentalization location with specificity (step 274).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for characterizing a hydrocarbon reservoir of interest traversed by at least one wellbore, the method comprising:
    (a) using a numerical model to simulate over geological time a non-equilibrium concentration of an asphaltene component as a function of location within the wellbore;
    (b) analyzing fluid samples acquired from at least one wellbore that traverses the reservoir of interest to measure concentration of the asphaltene component as a function of location within the wellbore;
    (c) comparing the non-equilibrium concentration of the asphaltene component as a function of location within the wellbore resulting from the simulation of (a) to the concentration of the asphaltene component as a function of location within the wellbore as measured in (b); and
    (d) characterizing the reservoir of interest based upon the comparing of (c).

2. The method of claim 1, wherein the reservoir fluid within the at least one wellbore is determined to be connected and in a state of non-equilibrium in the event that there are small differences between the non-equilibrium concentration of the asphaltene component as a function of location within the wellbore resulting from the simulation of (a) and the concentration of the asphaltene component as a function of location within the wellbore as measured in (b).

3. The method of claim 2, comprising:
    tuning the numerical model based on uncertainties associated with the analysis of (b) to obtain a tuned numerical model;
    repeating the simulation of (a) using the tuned numerical model; and
    repeating the comparison of (c) using the results of the simulation of (a) using the tuned numerical model.

4. The method of claim 1, wherein the reservoir fluid within the at least one wellbore is determined to be compartmentalized in the event that there are large differences between the non-equilibrium concentration of the asphaltene component as a function of location within the wellbore resulting from the simulation of (a) and the concentration of the asphaltene component as a function of location within the wellbore as measured in (b).

5. The method of claim 4, comprising validating the determination of compartmentalization based on a geochemical analysis of the hydrocarbon reservoir of interest.

6. The method of claim 4, comprising performing downhole fluid analysis (DFA) of the hydrocarbon reservoir of interest to determine a compartmentalization location of the hydrocarbon reservoir of interest.

7. The method of claim 1, wherein the analyzing of (b) involves downhole fluid analysis performed within the wellbore on live hydrocarbon fluids extracted from the reservoir of interest.

8. The method of claim 1, wherein the analyzing of (b) involves laboratory fluid analysis performed on at least one hydrocarbon fluid sample collected from the reservoir of interest.

9. The method of claim 1, wherein the numerical model is based on at least one of a depth, a length, a permeability, a porosity, or a viscosity, or any combination thereof, of the reservoir of interest.

10. The method of claim 1, wherein a boundary condition of the numerical model is a zero flux boundary condition if the reservoir of interest does not have a gas charge and the boundary condition of the numerical model is a gas influx boundary condition if the reservoir of interest has a gas charge.

11. The method of claim 1, wherein the numerical model is based on an equation of the form $$\frac{\partial (x_1/V)}{\partial t} + \nabla \cdot \left( \frac{x_1 u}{V} - \frac{M_2}{MV} D_{12} \left( \gamma^{FH} \nabla x_1 + \frac{\Delta \rho x_1 V_1}{\rho RT} \nabla P \right) \right) = 0$$

where
$x_1$ is the mole fraction of a first component of the reservoir fluid,
V is the molar volume of the reservoir fluid,
t is the time,
$\nabla$ is the gradient operator,
u is the pore velocity vector,
$M_2$ is the molecular weight of a second component of the reservoir fluid,
M is the molecular weight of the reservoir fluid,
$D_{12}$ is the molecular diffusion coefficient of the first and second components,
$\gamma^{FH}$ is the non-ideality term,
$\rho$ is the mass density of the reservoir fluid,
$\Delta \rho$ is the difference between the mass density of the first component and the mass density of the reservoir fluid,
$V_1$ is the molar volume of the first component,
R is the universal gas constant,
T is the temperature of the reservoir fluid, and
P is the pressure of the reservoir fluid.

12. The method of claim 11, wherein the numerical model is developed by combining the equation with a second equation representing mass conservation of the reservoir fluid.

13. The method of claim 1, wherein the simulation of (a) comprises a three-dimensional simulation.

14. A system for characterizing a hydrocarbon reservoir of interest traversed by at least one wellbore, comprising:
    a downhole tool configured to collect formation fluid from the hydrocarbon reservoir of interest within a sample chamber disposed in a downhole tool; and
    a controller comprising machine readable instructions disposed on a memory device, wherein the instructions monitor or control operations of the downhole tool to:

(a) use a numerical model to simulate over geological time a non-equilibrium concentration of an asphaltene component as a function of location within the wellbore;

(b) analyze fluid samples acquired from at least one wellbore that traverses the reservoir of interest to measure concentration of the asphaltene component as a function of location within the wellbore;

(c) compare the non-equilibrium concentration of the asphaltene component as a function of location within the wellbore resulting from the simulation of (a) to the concentration of the asphaltene component as a function of location within the wellbore as measured in (b); and (d) characterize the reservoir of interest based upon the comparison of (c).

15. The system of claim 14, wherein the instructions monitor or control operations of the downhole tool to determine the reservoir fluid within the at least one wellbore to be connected and in a state of non-equilibrium in the event that there are small differences between the non-equilibrium concentration of the asphaltene component as a function of location within the wellbore resulting from the simulation of (a) and the concentration of the asphaltene component as a function of location within the wellbore as measured in (b).

16. The system of claim 14, wherein the instructions monitor or control operations of the downhole tool to determine the reservoir fluid within the at least one wellbore to be compartmentalized in the event that there are large differences between the non-equilibrium concentration of the asphaltene component as a function of location within the wellbore resulting from the simulation of (a) and the concentration of the asphaltene component as a function of location within the wellbore as measured in (b).

17. The system of claim 14, wherein the numerical model is based on an equation of the form $$\frac{\partial(x_1/V)}{\partial t} + \nabla \cdot \left( \frac{x_1 u}{V} - \frac{M_2}{MV} D_{12} \left( \gamma^{FH} \nabla x_1 + \frac{\Delta \rho x_1 V_1}{\rho RT} \nabla P \right) \right) = 0$$

where
- $x_1$ is the mole fraction of a first component of the reservoir fluid,
- $V$ is the molar volume of the reservoir fluid,
- $t$ is the time,
- $\nabla$ is the gradient operator,
- $u$ is the pore velocity vector,
- $M_2$ is the molecular weight of a second component of the reservoir fluid,
- $M$ is the molecular weight of the reservoir fluid,
- $D_{12}$ is the molecular diffusion coefficient of the first and second components,
- $\gamma^{FH}$ is the non-ideality term
- $\rho$ is the mass density of the reservoir fluid,
- $\Delta \rho$ is the difference between the mass density of the first component and the mass density of the reservoir fluid,
- $V_1$ is the molar volume of the first component,
- $R$ is the universal gas constant,
- $T$ is the temperature of the reservoir fluid, and
- $P$ is the pressure of the reservoir fluid.

* * * * *